Oct. 16, 1956 L. BLACK 2,767,367
GENERATOR FREQUENCY CONTROL BY ELECTRIC BRAKING
Filed March 3, 1953 4 Sheets-Sheet 1

INVENTOR.
LOUIS BLACK
BY James B. Christie
ATTORNEY

Oct. 16, 1956  L. BLACK  2,767,367
GENERATOR FREQUENCY CONTROL BY ELECTRIC BRAKING
Filed March 3, 1953  4 Sheets-Sheet 2

INVENTOR.
LOUIS BLACK
BY James B. Christie
ATTORNEY

Oct. 16, 1956  L. BLACK  2,767,367
GENERATOR FREQUENCY CONTROL BY ELECTRIC BRAKING
Filed March 3, 1953  4 Sheets-Sheet 3

INVENTOR.
LOUIS BLACK
BY James B. Christie
ATTORNEY

Oct. 16, 1956          L. BLACK          2,767,367

GENERATOR FREQUENCY CONTROL BY ELECTRIC BRAKING

Filed March 3, 1953          4 Sheets-Sheet 4

INVENTOR.
LOUIS BLACK
BY
James B. Christie
ATTORNEY.

United States Patent Office 2,767,367
Patented Oct. 16, 1956

2,767,367

GENERATOR FREQUENCY CONTROL BY ELECTRIC BRAKING

Louis Black, Altadena, Calif., assignor, by mesne assignments, to Aerovox Corporation, a corporation of Massachusetts Application March 3, 1953, Serial No. 340,128

2 Claims. (Cl. 322—32)

This invention relates to speed controls, and particularly to frequency-responsive apparatus for controlling the action of a brake.

Numerous arrangements have been devised for controlling the speed of rotation of a rotatable member, such as mechanical governors and electrical arrangements for controlling the power applied to the prime mover for the rotatable member. It is common practice to employ electrical arrangements for controlling the speed of rotation of a rotatable member when precise control is required or when the rotatable member operates at high speeds. Such arrangements are ordinarily complex, and if a fast acting control is required the speed control is particularly complex.

I have discovered that a fast acting and precise speed control for a rotatable member can be provided by employing a dissipative brake to control the speed of rotation of a member which is driven by a power source having a speed which is an inverse function of the load on the power source, and that the action of the brake can be controlled by a frequency-responsive network of simple design which is fed with a signal having a frequency which is synchronized with the speed of rotation of the rotatable member.

In a preferred form of my invention, I provide an alternating current generator which is driven by the rotatable member so that the frequency of the signal produced by the generator is proportional to the speed of rotation of the member which is to be controlled, a low-pass filter and a high-pass filter are coupled to the output of the generator, and a magnetic amplifier which is responsive to the outputs of the two filters is employed to control the action of a brake coupled to the rotatable member. The two filters are arranged so that their response curves overlap in the cutoff region of each filter, and the magnetic amplifier is arranged so that it applies a signal to the brake when the signals passed by the two filters have predetermined magnitudes.

The braking action controls the speed of the prime mover and hence the frequency of the signal produced by the alternating current generator. Due to the slope of the response curves of the two filters, the frequency at which the brake is actuated can be controlled with great accuracy. Also, if the signal which is provided through one of the filters fails, the control action is not completely lost.

If desired, a feedback coupling can be employed between the output of the magnetic amplifier and a control winding in the amplifier for increasing the tightness of control.

The apparatus of my invention is particularly suitable for controlling the frequency or the amplitude of the signal provided by an alternator which is driven by a variable speed prime mover such as a turbine or an electric motor. In such an arrangement, the brake is coupled to the shaft which drives the alternator, and the speed control circuit may be connected to the winding of the alternator which provides the useful power output. In the alternative, an auxiliary winding, which is separate from the main winding of the alternator, may be employed to provide signals for the speed control circuit. Such an arrangement makes the operation of the speed control circuit substantially independent of power losses in the main winding and of the power factor of the load.

In a still further refinement, an auxiliary winding is employed in conjunction with the main winding of the alternator, and a differential voltage is derived representing the difference in the voltages provided by the two windings. This differential voltage is a function of the loss in the main winding which in turn is a function of the load on the alternator. This voltage may be employed to shift the mean operating speed of the system to some speed higher than normal in order to cause the output voltage of the main winding of the alternator to be maintained approximately constant even under heavy loads, thus improving the voltage regulation of the system.

This invention is explained with reference to the drawings, in which.

Figure 1:
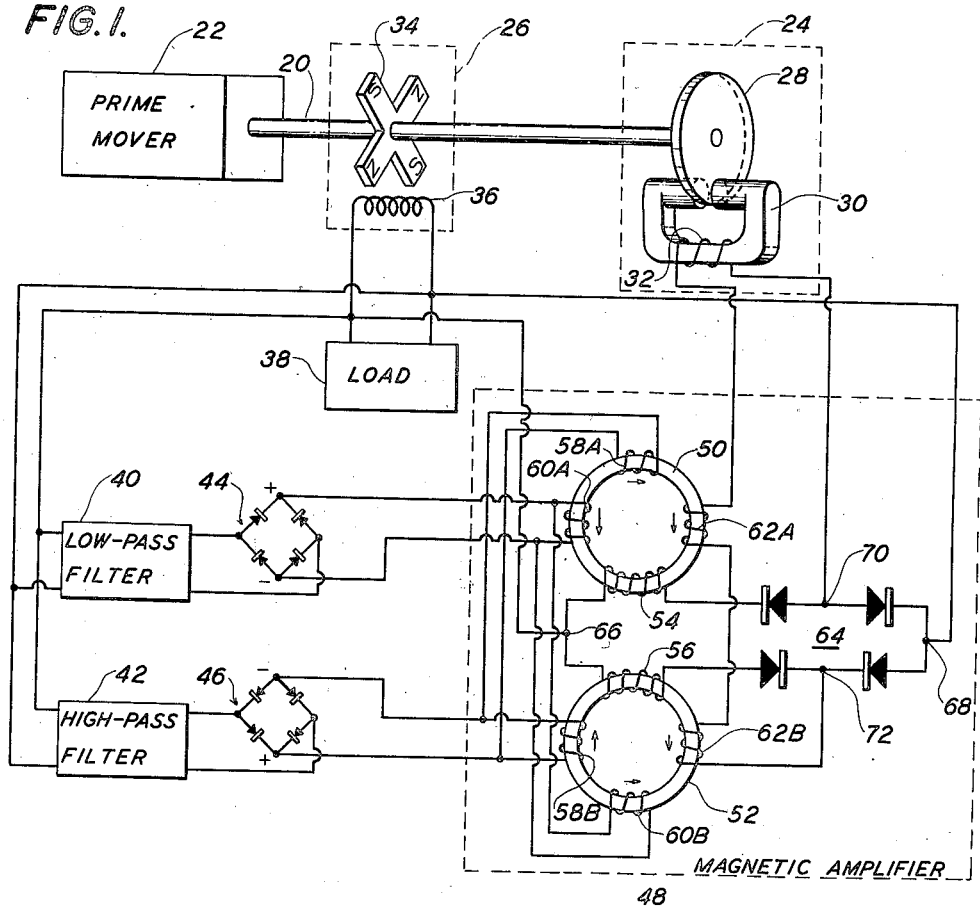
Fig. 1 shows one embodiment of the speed control of my invention.

In the apparatus of Fig. 1, the speed of rotation of a rotatable member or shaft 20 which is driven by a variable speed prime mover 22, is controlled by a dissipative brake 24. An alternator 26 which is actuated by the shaft 20 serves to provide signals for controlling the brake 24 in accordance with the speed of rotation of the shaft 20.

The prime mover 22 may be any suitable source of power capable of driving the shaft 20 at a speed which is an inverse function of the load on the shaft 20. By way of example, the source of power may be a turbine, an electric motor, or a constant speed prime mover coupled to the shaft 20 through a friction clutch which provides slippage in accordance with the load on the shaft 20.

An eddy current type brake 24 is illustrated for the purpose of this disclosure. However, various other types of brakes may be employed if desired. The brake comprises a conductive disk 28 connected to the rotatable shaft 20 and an electro-magnet having a core 30 and a winding 32. The currents which are induced in the conductive disk 28 as it passes between the pole pieces of the electromagnet provide a braking effect which is proportional to the current applied to the control winding 32 of the electromagnet. If alternating current is employed to control the brake, the core 30 should be laminated. If direct current is employed to control the brake, the core 30 may be composed of solid magnetizable material.

The alternator 26 may be a conventional type having an armature 34 which is driven by the shaft and at least one winding 36 which provides an alternating current signal having a frequency which is proportional to the speed of rotation of the shaft 20.

Figure 4:
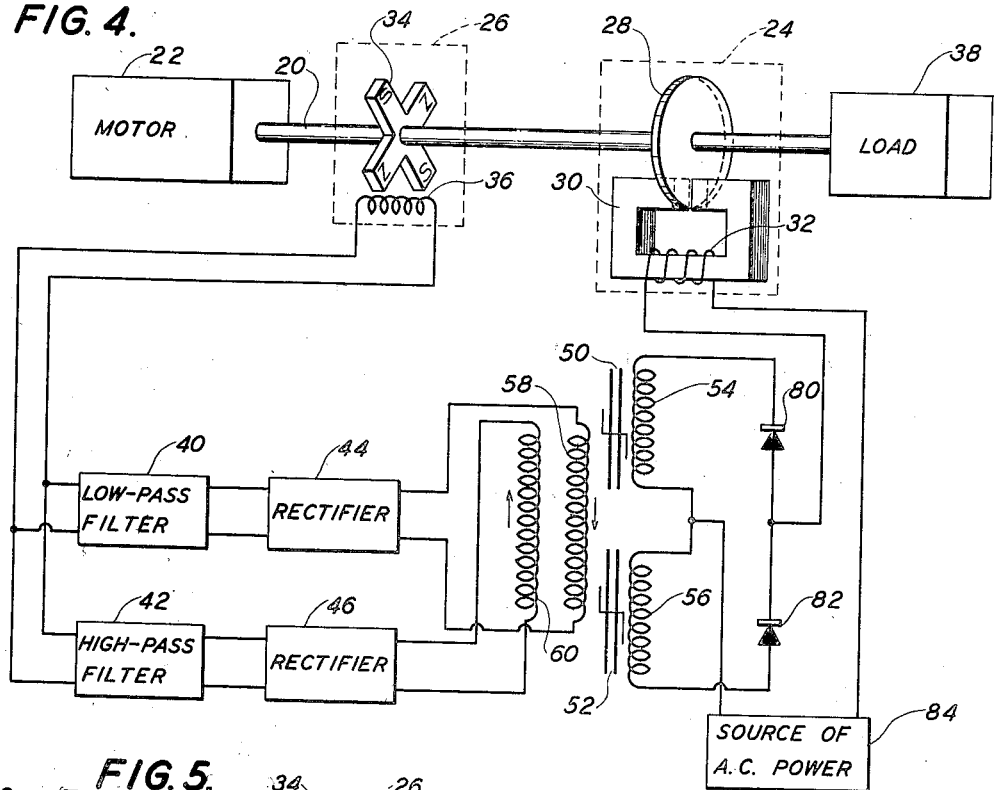
Figs. 4 to 6 illustrate other embodiments of my invention.
Figure 6:
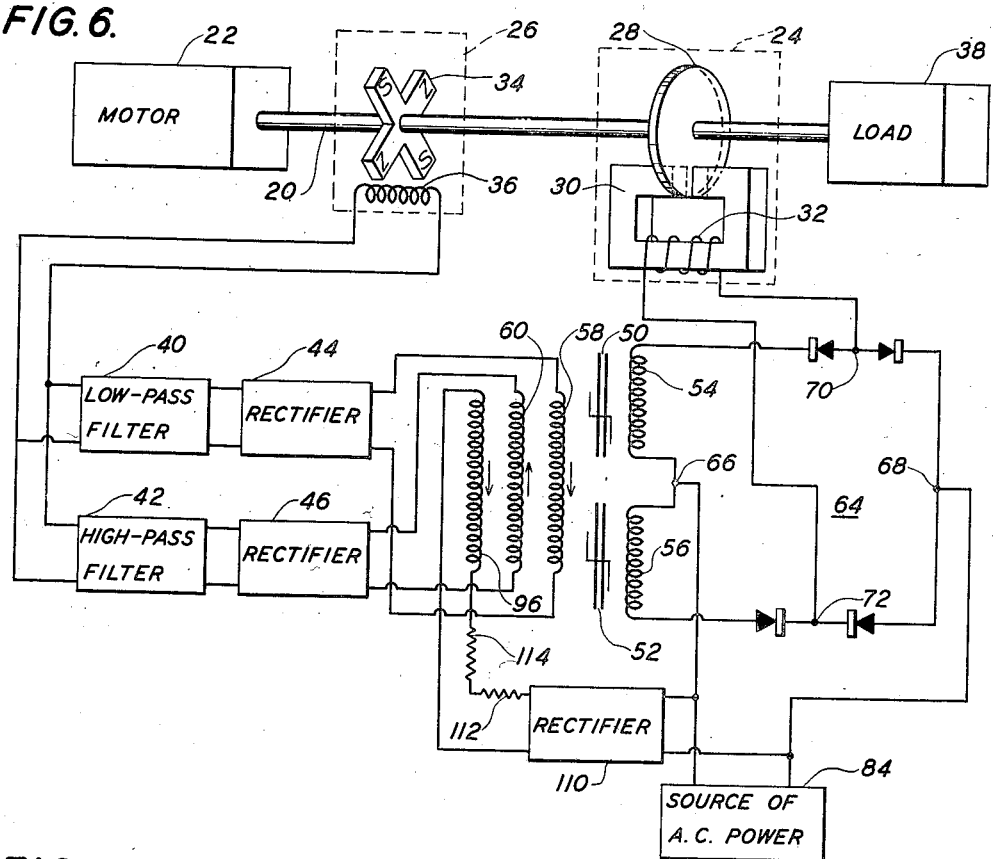

As shown in Fig. 1, a load 38 is supplied with energy from the alternator. If desired, the energy which is supplied to the load may be derived directly from the rotatable shaft 20, as illustrated in Figs. 4 and 6.

In the various embodiments of the invention which are disclosed herein, the signal from the alternator 26 is applied to a frequency-responsive control circuit which provides signals to the control winding 32 of the brake. The frequency-responsive control circuit controls the action of the brake and hence controls the speed of rotation of the shaft 20.

There must always be some braking in order to maintain control over the speed of the shaft 20. Under maximum load a predetermined minimum braking is required. The maximum load plus the power lost due to the required minimum braking must be equal to or less than the minimum amount of power available from the prime mover. The maximum power dissipation in the brake must equal the maximum power available from the prime mover less the minimum load which is to be applied.

Speed control arrangements of this type have several advantages over conventional control arrangements in that the speed control may be employed with various types of prime movers including prime movers such as turbines, in which the power applied to the prime mover cannot be controlled with accuracy or cannot be controlled at all. Also the speed control is particularly suitable for use in extremely high speed devices where precise control is required. The arrangement has the further advantage that the use of mechanical parts which might introduce frictional losses is minimized. For example, in the apparatus of Fig. 1 the only frictional losses involved are those inherent in the support arrangement for the shaft 20, and any losses which may be inherent in the prime mover 22. If the prime mover is a turbine, the only frictional losses are those in bearings required to support the shaft 20.

The feature of providing a minimum of moving parts which cause frictional losses is of advantage in high speed devices, and it has the particular advantage of providing apparatus which may be operated over a wide temperature range without impairing the operation of the speed control.

The frequency-responsive control circuit which is illustrated in Fig. 1 comprises a low-pass filter 40 and a high-pass filter 42 having their input circuits connected to the output of the alternator 26. The outputs of the two filters are applied to rectifiers 44 and 46 which serve to provide control signals for a magnetic amplifier 48.

The magnetic amplifier is a self-saturating saturable reactor device having a pair of cores 50 and 52 composed of a saturable magnetic material. A pair of output windings 54 and 56 are provided on the saturable cores for controlling the application of energy to the control winding 32 of the brake. Control windings 58A, 58B and 60A, 60B are provided on the saturable cores for controlling the magnetic flux in the cores. For the purpose of illustration, the winding 58A, 58B and the windings 60A and 60B are shown as separate windings. It is preferable to place the two magnetic cores side by side with their axes aligned and to provide one winding 58 and one winding 60 which passes around both cores, in accordance with conventional magnetic amplifier techniques.

If desired, feedback windings 62A and 62B may be provided on the magnetic cores. In practice it is preferable to provide one winding which encompasses both cores as discussed above with reference to the control windings.

The small arrows shown in Fig. 1 illustrate the direction of the magnetic flux which is produced in the cores by the respective control and feedback windings.

A rectifier 64 is connected to the windings 54 and 56 in accordance with conventional magnetic amplifier techniques. The alternating current power from the alternator 26 is connected across the points 66 and 68 and a rectified version of the signal is provided at the terminals 70 and 72. The magnitude of the direct current signal which is provided at the terminals 70 and 72 is determined by the current passed by the windings 54 and 56. This is controlled by the flux in the saturable reactors 50 and 52 which in turn is controlled by the currents applied to the windings 58, 60 and 62 on the two cores.

Figure 5:
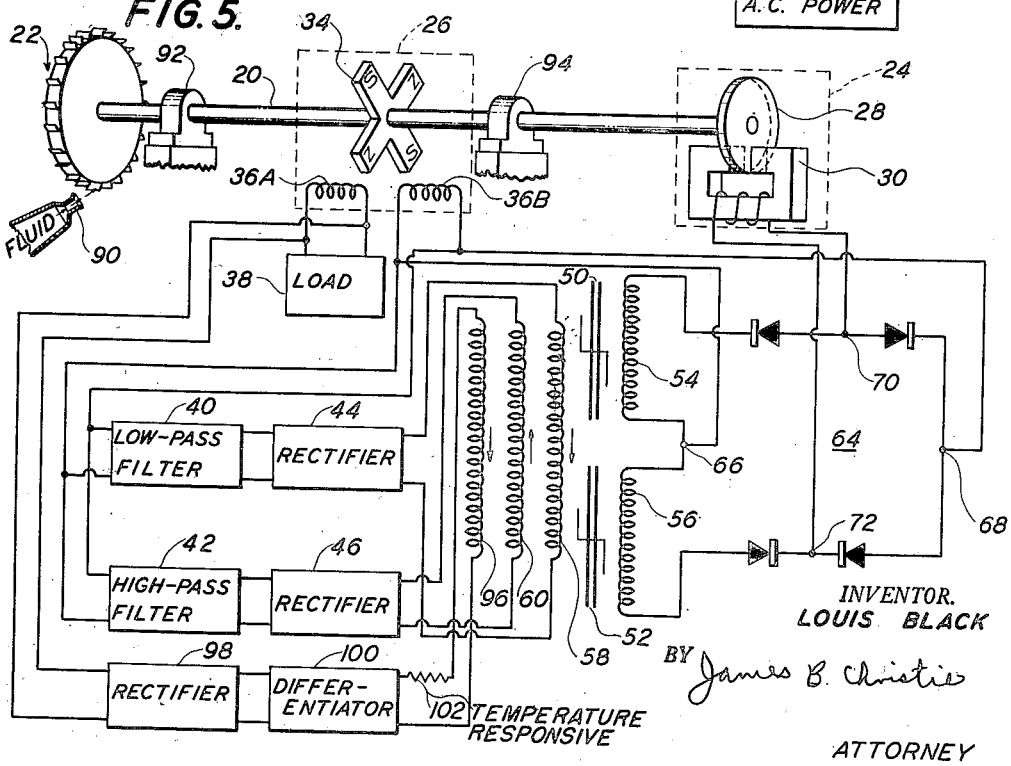

The direct current voltage which is provided at the points 70 and 72 is applied through the feedback winding 62 to the control winding 32 of the magnetic brake. The feedback winding 62 provides positive feedback which serves to provide tighter speed control or regulation for the apparatus. If desired, the feedback winding 62 may be omitted and the voltage provided at the terminals 70 and 72 may be applied directly to the control winding 32 of the brake as illustrated in Fig. 5.

It is preferable to provide filter circuits in the circuits between the rectifiers 44 and 46, and the control windings 58 and 60 on the saturable reactors for preventing any signals which are generated in the control windings from reaching the rectifiers 44 and 46. Such filters are not always required, and they are not shown in the various embodiments of the invention disclosed herein in order to simplify the disclosure.

Figure 2:
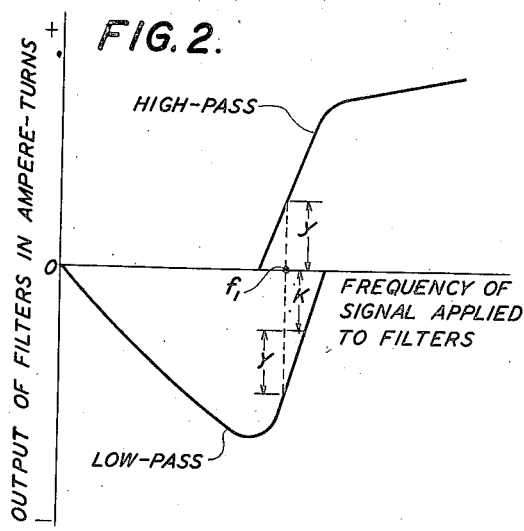
Figs. 2 and 3 show curves illustrating the operation of the apparatus of Fig. 1.

When the prime mover 22 is turned on, the speed of the control shaft 20 and hence the frequency of the signal produced by the alternator 26 increases as the speed of the prime mover increases. The voltages produced across the rectifiers 44 and 46 vary as shown in Fig. 2 as the frequency of the signal produced by the alternator 26 increases. The response curves for the two filters are arranged to overlap so that at the desired operating frequency $f_1$ the ampere-turns in the saturable reactors provided by the low-pass filter exceed the ampere-turns produced by the high-pass filter by a predetermined amount, as illustrated in Fig. 2. That is, at the frequency $f_1$ the magnitude of the control signal produced through the low-pass filter less the magnitude Y of the control signal produced through the high-pass filter is equal to K.

Figure 3:
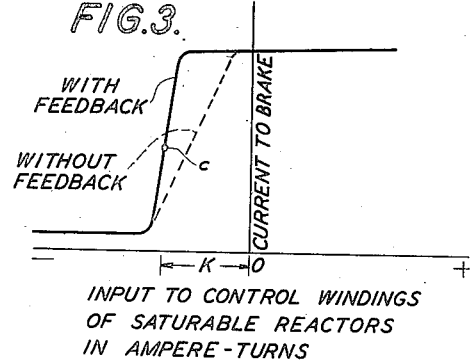

Fig. 3 shows the output of the magnetic amplifier with respect to ampere-turns input to the control windings of the saturable reactors. When the ampere-turns input to the control windings of the saturable reactors is equal to K, the current which is applied to the control for the brake has a magnitude which is indicated by the point C on the curve of Fig. 3. The point C is located at about the center of the steeply inclined leg of the curve. Thus, the current which is applied to the control for the brake is controlled by the frequency of the signal produced by the alternator 26, and slight variations of the signal from the desired operating frequency $f_1$ cause large variations in the current which is applied to the brake. Hence, tight speed control is provided at the desired operating speed.

It will be observed that very little current is applied to the brake when the frequency of the signal provided by the alternator is appreciably less than the frequency $f_1$ and that a high current is applied to the brake when the frequency of the current provided by the alternator is appreciably greater than the frequency $f_1$. Thus, there is very little braking until the apparatus approaches the desired operating speed, and maximum braking is effected if the apparatus exceeds the desired operating speed.

If the control signal provided through the channel including the low-pass filter fails or if the control signals provided through both the low-pass and the high-pass filters fail, the brake is actuated immediately and the control shaft is prevented from rotating out of control.

If the control signal provided through the channel including the high-pass filter fails, the control action is still maintained but at a speed which is slightly higher than the desired operating speed.

The dashed line shown on Fig. 3 illustrates the response of the magnetic amplifier when the feedback windings 62 are omitted. It will be observed that the tightness of control is somewhat less without feedback due to the fact that the slope of the amplifier response curve is less. In the other embodiments of the invention disclosed herein, feedback is not shown in order to simplify the disclosures. It will be apparent that feedback may be employed in each embodiment if desired.

Fig. 4 shows a modification of the apparatus of Fig. 1 wherein the power for the load is derived directly from the rotatable shaft 20 and wherein the magnetic amplifier is arranged to provide an alternating current signal for controlling the brake.

The saturable core reactor arrangement of the magnetic amplifier is shown schematically in order to simplify the disclosure.

The windings 54 and 56 on the self-saturating saturable core reactors are connected across a pair of rectifiers 80 and 82. A source 84 of alternating current power has one terminal connected to the junction between the windings 54 and 56 and the other terminal is connected through the control winding 32 of the brake to the junction between the rectifiers 80 and 82. If desired, the source 84 of alternating current power may be the winding 36 of the alternator.

The core 30 of the brake in this embodiment of the invention should be laminated so that it will function satisfactorily on alternating current power.

The embodiment shown in Fig. 4 functions in a manner similar to that described above with respect to Fig. 1 with the exception that the alternating current which is controlled by the windings 54 and 56 on the saturable reactor is applied directly to the control winding 32 of the brake, rather than being rectified so as to provide a direct current for controlling the magnetic brake.

Fig. 5 shows an embodiment of the apparatus wherein the prime mover 22 is a turbine which is supplied with fluid through a nozzle 90. By way of example, the fluid may be steam or it may be derived from a solid propellant gas generator which provides gas due to combustion of solid material which burns rapidly. A pair of bearings 92 and 94 are shown for supporting the moving parts.

If desired, an auxiliary winding may be employed in the alternator for providing a signal for the frequency-responsive control system. With such an arrangement, the action of the frequency-responsive control system is substantially independent of the power factor of the load. Such an arrangement is illustrated in Fig. 5 wherein the winding 36A is the power winding of the alternator and the winding 36B provides the control signal.

Also, a rate control circuit may be employed in addition to the frequency-responsive control in order to provide tight control when the load changes abruptly. In this case an additional control winding 96 is provided on the saturable core reactors of the magnetic amplifier. A rectifier 98 is connected across the load winding 36A of the alternator for providing a direct current signal having a magnitude which varies in accordance with the output of the alternator. The output of the rectifier is connected through a conventional differentiating circuit 100 to the auxiliary winding 96.

The rectifier 98, the differentiator 100 and the auxiliary winding 96 serve to cause the magnetic amplifier to reduce the braking when sharp increases in load are applied to the alternator and to increase the braking when the load is abruptly reduced or completely removed from the alternator.

The rate control circuit supplies feedback for suppressing hunting as well as providing tight control when the load changes abrutply. If only suppression of hunting is desired in the rate control circuit, it may be coupled to the winding 36B of the alternator.

If desired, a temperature-responsive resistance 102 may be connected in a series between the differentiator 100 and the auxiliary winding 96 for providing additional control action. By way of example, the resistance 102 may be a temperature compensating resistance which varies the control action so as to maintain the operating speed substantially constant at any operating temperature for the control apparatus. Also the resistance 102 may be a thermistor which provides a resistance which is governed by the temperature of a solid propellant employed to provide gas through the nozzle 90 due to combustion of the solid propellant. This is desirable when a solid propellant gas generator is employed in apparatus which must operate over a wide temperature range, because such gas generators have different gas generating characteristics at different initial temperatures. Such generators ordinarily employ one combustible material to initiate operation of the generator and another combustible material to maintain the flow of gas for a predetermined period of time. The amount of gas produced by the material which serves to initiate operation of the generator is dependent upon the initial temperature of the material. Hence, use of a suitable compensator resistance 102 is desirable in order to provide adequate control when the gas generator is ignited.

The apparatus of Fig. 6 is similar to that of Fig. 1 except that a source 84 of alternating current power is employed to provide current to the brake, and an auxiliary winding 96 is provided on the saturable core reactors to provide additional control action.

A rectifier 110 is connected across the source 84 of alternating current power, and the direct current output of the rectifier 110 is applied through a resistor 112 across the auxiliary control winding 96. The resistor 112 is proportioned to provide a proper current to the auxiliary control winding 96.

If desired, a temperature-responsive resistor 114 may be provided for providing temperature correction so that the apparatus will function properly at any operating temperature. Temperature-compensating resistors may be employed in the filter circuits, in the magnetic amplifier circuit, or in the brake circuit.

Figure 7:
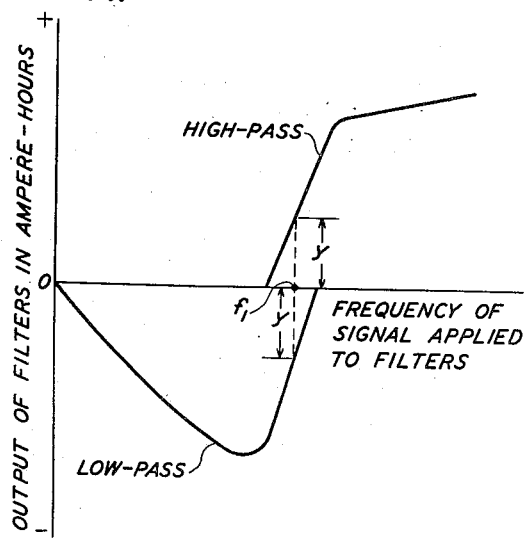
Figs. 7 and 8 show curves illustrating the operation of the apparatus of Fig. 6.

In this embodiment of the invention it is desirable to arrange the apparatus so that the outputs of the filters 40 and 42 are equal at the desired operating frequency as shown in Fig. 7. This substantially eliminates the effect of temperature changes on the output of the saturable core reactors.

Figure 8:
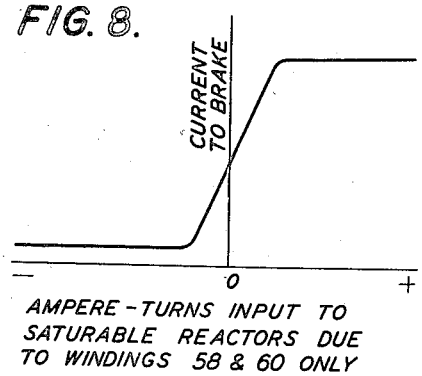

Fig. 8 shows a response characteristic of the magnetic amplifier of Fig. 6. It will be observed that the control action is centered about the axis at which the ampere-turns input to the saturable reactors due to the windings 58 and 60 is zero, rather than being offset to the left as in Fig. 3.

The response of the magnetic amplifier of Fig. 1 with respect to the parameter K shown in Fig. 3 is somewhat dependent upon the operating temperature of the amplifier. Since the parameter K is eliminated in the embodiment of the invention shown in Fig. 6 due to the action of the auxiliary winding 96, variations in the operating temperatures have very little effect upon the control action.

Figure 9:
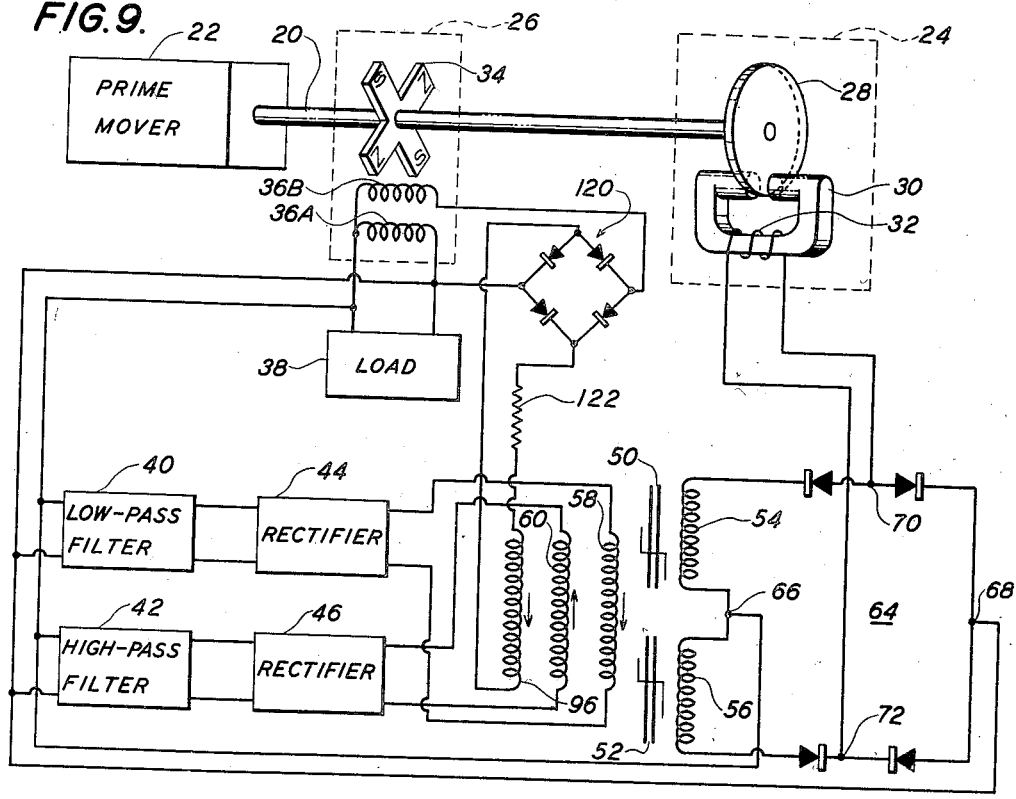
Fig. 9 shows another embodiment of my invention.

Fig. 9 illustrates an embodiment of the invention which is arranged to provide a substantially constant voltage to the load irrespective of variations in the amount of load applied to the alternator.

The main winding 36A of the alternator is connected to the load 38. An auxiliary winding 36B is provided which has an output voltage which is equal to or slightly less than that of the main winding 36A when the main winding is lightly loaded. The windings 36A and 36B should be at the same phase. A rectifier 120 is connected between the windings 36A and 36B, and it serves to provide a direct current voltage which is proportional to the difference in the magnitudes of the alternating current voltages provided by the windings 36A and 36B. The output of the rectifier 120 is applied through a control resistor 122 to an auxiliary control winding 96 on the saturable reactors.

When the main winding 36A is loaded, its voltage is reduced, and the direct current signal which is produced by the rectifier 120 is a function of the magnitude of the load which is applied to the winding 36A. The direct current voltage which is produced across the rectifier 120 is employed to shift the mean operating speed of the system to some speed higher than normal in order to bring the voltage of the main winding 36A up to approximately the same voltage as supplied under the lightly loaded condition, thus improving the voltage regulation of the system. This embodiment of the invention is particularly suitable for use in conjunction with permanent magnet alternators.

I have shown several embodiments of my invention to illustrate the wide variations which are possible. It will be readily apparent that various features shown in any one embodiment of the invention may be incorporated in the other embodiments if desired.

Although full-wave rectifiers at the output of the filters and full-wave magnetic amplifiers have been illustrated in the drawings, it will be apparent that half-wave arrangements may be employed in accordance with conventional techniques.

In the control circuits for the magnetic amplifiers which have been illustrated, the control signals have been summed magnetically in the cores of the saturable reactors. It will be apparent that this may be done by electrical systems and the resultant signal applied to a single control winding on the cores of the saturable reactor.

I claim:

1. A speed control comprising a rotatable member, a dissipative brake coupled to the rotatable member and having a control which is responsive to electric current, an alternator coupled to the rotatable member and having a pair of output windings for producing alternating current signals having a frequency which is proportional to the speed of rotation of the rotatable member, means for connecting one of the output windings of the alternator to a load, a high-pass and a low-pass filter coupled to the other output winding of the alternator, a pair of rectifiers for rectifying the signals produced at the outputs of the two filters, a magnetic amplifier having three control windings, means connecting two of the control windings to the output circuits of said pair of rectifiers, a third rectifier coupled across the load winding of the alternator, a differentiating circuit coupled between the output of the third rectifier and the third control winding of the magnetic amplifier, and means for providing electric current through the output circuit of the magnetic amplifier to the control for the brake so that the action of the brake is controlled by the frequency of the signal produced by the alternator.

2. A speed control comprising a rotatable member, a dissipative brake coupled to the rotatable member and having a control which is responsive to electric current, an alternator coupled to the rotatable member and having a pair of output windings for producing alternating current signals having a frequency which is proportional to the speed of rotation of the rotatable member, means for connecting one of the output windings of the alternator to a load, a high-pass and a low-pass filter coupled to the other output winding of the alternator, a pair of rectifiers for rectifying the signals produced at the outputs of the two filters, a magnetic amplifier having three control windings, two of the control windings being connected to the output circuits of said pair of rectifiers, a third rectifier coupled across the load winding of the alternator, a differentiating circuit coupled to the output circuit of the third rectifier, a temperature-responsive resistor connected between the output circuit of the differentiating circuit and the third control winding of the magnetic amplifier for controlling the response of the amplifier, and means for providing electric current through the output circuit of the magnetic amplifier to the control for the brake so that the action of the brake is controlled by the frequency of the signal produced by the alternator.

References Cited in the file of this patent

UNITED STATES PATENTS

| | | |
|---|---|---|
| 1,749,304 | Scheppmann et al. | Mar. 4, 1930 |
| 2,157,834 | Schmidt | May 9, 1939 |
| 2,496,730 | Lindbeck et al. | Feb. 7, 1950 |
| 2,610,315 | McKendry et al. | Sept. 9, 1952 |
| 2,631,268 | Ransom et al. | Mar. 10, 1953 |
| 2,637,014 | Stallard | Apr. 28, 1953 |
| 2,641,738 | Sikorra | June 9, 1953 |